INVENTORS
Walter Faber
Robert Machaczek
BY
ATTYS.

March 10, 1970 W. FABER ET AL 3,500,295
PLUG-AND-SOCKET CONNECTOR PARTICULARLY MINIATURIZED
ELECTRICAL STRUCTURES AND METHOD
OF MAKING THE SAME
Filed Sept. 22, 1967 4 Sheets-Sheet 2

INVENTORS
Walter Faber
Robert Machaczek
BY
ATTYS.

INVENTORS
*Walter Faber*
*Robert Machaczek*

BY
ATTYS.

INVENTORS
Walter Faber
Robert Machaczek
BY
ATTYS.

__United States Patent Office__

3,500,295
Patented Mar. 10, 1970

3,500,295
PLUG-AND-SOCKET CONNECTOR PARTICULARLY MINIATURIZED ELECTRICAL STRUCTURES AND METHOD OF MAKING THE SAME
Walter Faber and Robert Machaczek, Munich, Germany, assignors to Siemens Aktiengesellschaft, a corporation of Germany
Filed Sept. 22, 1967, Ser. No. 669,894
Claims priority, application Germany, Sept. 26, 1966, S 106,112
Int. Cl. H01r *13/50*
U.S. Cl. 339—176                                      7 Claims

ABSTRACT OF THE DISCLOSURE

A plug-and-socket connector, particularly for printed circuits and the like, having a socket-type contact strip and a plug-type terminal strip insertable therein, in which respective contact strips are fabricated by the punching of the contact elements from strip material and embedding thereof in a strip of thermoplastic synthetic material by an injection-molding operation, said strips having means thereon for interlocking engagement therebetween, one or more of such contact strips being rigidly mounted in a body of insulating material by ultrasonic welding to form a unitary plug or cooperable socket structure, which structures are provided with mounting means, and means for guiding the same into cooperable engagement.

---

The invention relates to a plug-and-socket connector, particularly for printed circuits having a socket-type spring contact strip and a plug-type terminal strip insertable into the latter.

In view of the continuously progressive miniaturization of apparatus and components in electrical communications and transmission engineering, the construction of the plug-and-socket connections there employed becomes of constantly increasing importance, particularly with respect to reducing the dimensions and at the same time maintaining a constant or even greater dependability. A reduction of the dimensions of the plug-and-socket connectors obviously is necessary because with the reduction in size of the other pertinent components the plug-and-socket connection itself, due to its excessive dimensions, would largely offset such miniaturization. In more recent techniques there is a tendency toward employing printed circuit boards instead of free wiring. Due to the small dimension of the components on the printed circuit boards, it becomes possible to accommodate more and more printed circuit boards per unit area which, however, is limited, among other things, by the fact that the pertinent plug-and-socket connections cannot be reduced in size in the same proportion as the components mounted on the board.

Another problem of the increasing accumulation of components on a printed circuit board resides in the multiplication of the necessary connections on a circuit board. Hence, care must also be exercised that the necessary connections can be suitably provided for the miniaturization of the plug-and-socket connections.

Inasmuch as the necessary number of connections on the individual printed circuit boards often is subject to large variations, provisions must also be made that in each case terminal strips having different numbers of poles are available for the desired application, which involves increased manufacturing and warehousing expenditures. Consequently, efforts must be made towards substituting a minimum number and standardized designs for the large number of possible individual structural designs.

The above problems, however, become magnified if, for example, a plug-and-socket connector must be employed in a circuit technique, for instance in the so-called "multilayer technique." Here, the problem of a more efficient connection of a plurality of contacts with the corresponding contact points arranged on the circuit boards plays an important role. Such a plug-and-socket connection, is also suitable for use in the economical and more recent methods such as the percussion welding method or the so-called "wrap connection" method.

The problem underlying the invention is to create a plug-and-socket connector which efficiently meets the many-sided requirements for the miniaturization of plug-and-socket connections. To solve this problem the plug-and-socket connector according to the present invention is so constructed that a plug-type contact strip, fabricated by means of a punching operation is subsequently embedded in a strip of thermoplastic material by injection molding, and thereafter inserted in a structure or body of insulating material with several contacts disposed in series one behind the other and is connected with such body, particularly by means of supersonic welding, and that the cooperable socket-type spring contact strip is constructed in like fashion.

Several contact strips of this type can be arranged in side by side relation in such an insulating body. Between such contact strips there can also be disposed blank strips in order to establish a desired spacing. Pointed guides are provided on the insulating structure which provide protection for the contact parts against mechanical damage, which furthermore assure non-interchangeability during the pluging-in operation and effects a self-guidance of the terminal strips and the spring contact strips with respect to one another. Depending upon the application of the individual plug-and-socket connectors, the ends of the connecting lugs or terminals of the knife-blade contact and spring contacts can be clipped or bent over in desired directions. Utilization of such plug-and-socket connectors is particularly advantageous in the so-called multilayer technique. The invention enables the production of a plug-and-socket connector which can be employed for many purposes and which can be readily adapted to the respective applications. Thus, the desired number of poles in each case can always be attained in a simple manner and the gaps required between the individual contact banks can arbitrarily be increased or reduced depending upon the application. Such plug-and-socket connector is particularly suitable for use in the so-called wrap technique or for wiring connections utilizing the percussion process which is of recent development. Inasmuch as the respective plug-and-socket connector according to the mechanical assembly technique can be composed of individual parts, the production also is considerably simplified with respect to known arrangements and as a result production and maintenance costs are reduced.

The invention is explained in detail by means of the illustrative embodiments shown in the drawings, in which like reference numerals indicate like or corresponding parts, and in which:

FIG. 1*a* is a plan view and FIG. 1*b* end view of a plurality of plug-type terminal elements punched from strip stock;

FIGS. 2*a* and 2*b* are similar views respectively, of the strip illustrated in FIG. 1, following injection molding of an insulating body therefor and completion of the terminal structure, while FIG. 2*c* is a front elevational view of the structure of FIG. 2a, illustrating the manner in which several terminal structures may be stacked;

FIGS. 3a and 3c are transverse sections, of a plurality of terminal strips, such as illustrated in FIG. 2, which are assembled in various combinations in respective supporting structure of insulating material;

FIGS. 4a, 4b, 5a, 5b and 5c respectively correspond to FIGS. 1a, 1b, 2a, 2b and 2c, and illustrate the construction of cooperable socket-type terminal elements in the formation of terminal strips adapted to cooperate with the strips of FIG. 2;

FIG. 7 is a front elevational view of an insulating body, such as illustrated in FIG. 6a;

Figure 6A:
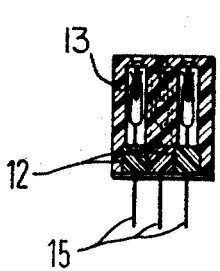
FIGS. 6a, 6b and 6c are transverse sections, similar to FIG. 3 of the assembly of a plurality of terminal strips such as illustrated in FIG. 5, assembled in various combinations in respective supporting structures, with the terminals and strips being only schematically illustrated.
Figure 6B:
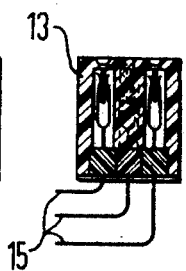
Figure 6C:
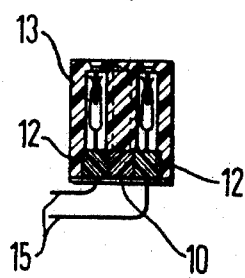
Figure 11:
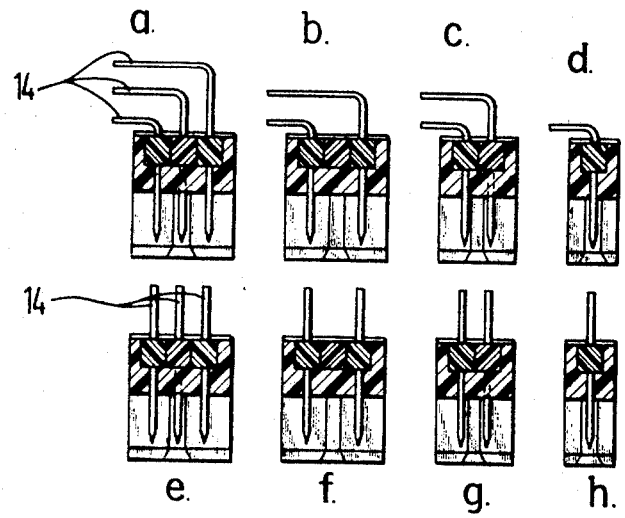

FIGS. 11a through h illustrate sections similar to those of FIG. 3, of various embodiments of plug-type terminal assemblies; and FIGS. 12a through h illustrate sections similar to those of FIG. 6, of various embodiments of socket-type terminal assemblies, corresponding to similarly designated embodiments of FIG. 11.

Figures 1A, 1B:
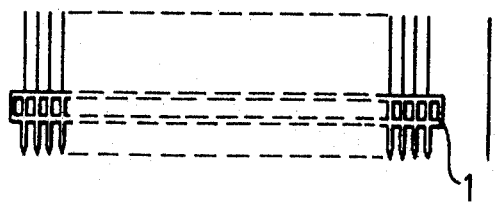
Figures 2A, 2B:
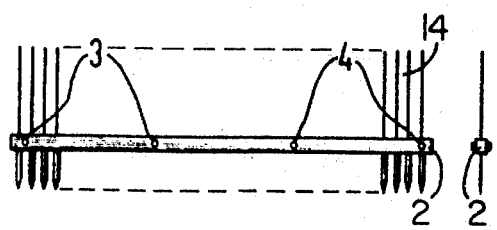
Figure 2C:
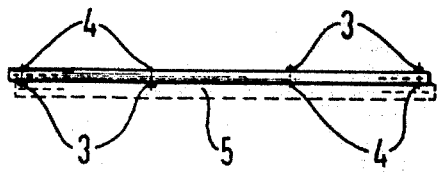
Figure 7:
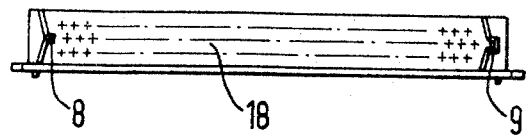
Figure 10:
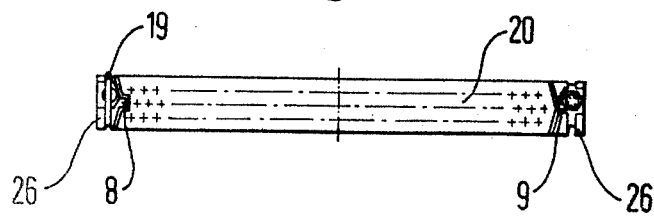
FIG. 10 is a view, similar to FIG. 7, of a modified construction.

Referring to FIGS. 1 to 3, FIG. 1 illustrates a punched strip 1 which can be made from strip stock and provided with an injection-molded elongated body 2 of thermoplastic material as illustrated in FIG. 2. Following the completion of the molding operation the portions of the strip connecting the respective terminal or contact elements can be cut away whereby each individual contact element is firmly supported in insulated relation with respect to other such elements. Each body 2 of each contact strip is provided with pairs of projections or pins 3, and bores or recesses 4 which are complemental in shape to the pins 3. The respective pairs of pins 3 and bores 4 are so arranged at opposite sides of the body that a plurality of such contact strips may be assembled in stacked arrangement, by rotating alternate bodies 180°, with adjacent bodies thereby being longitudinally offset by ½ the contact spacing to correspondingly dispose the contact elements carried by one body with respect to the contact elements carried by the adjacent bodies, as will be apparent from a reference to FIGS. 7 and 10. Each body and associated contact elements thus forms a contact strip or bank.

Figures 3A, 3B, 3C:
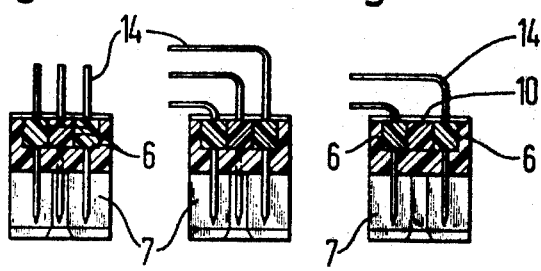
Figure 4A:
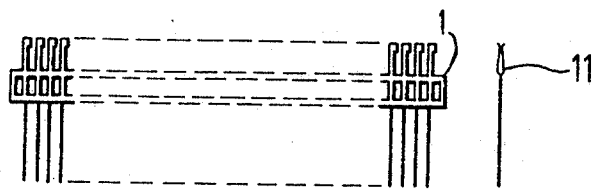
Figure 4B:
Figure 5A:
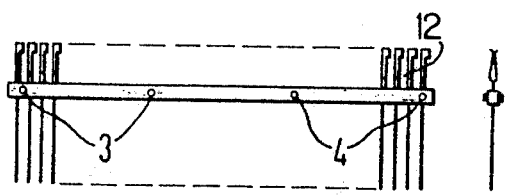
Figure 5B:
Figure 5C:
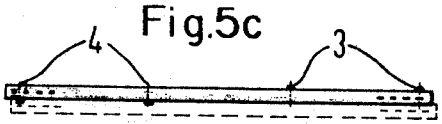
Figure 12:
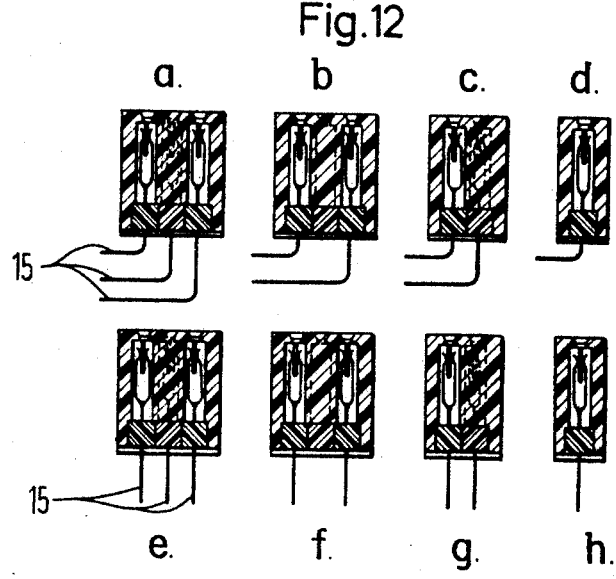

A suitable number of contact banks may be assembled, in dependence upon the number of poles required and embedded in a supporting structure 7 of insulating material, having pointed guide members 8 and 9, the contact banks being secured in the structure 7 by suitable means, such as ultrasonic welding, resulting in an assembly of the type illustrated in FIG. 3. Increased spacing between adjacent contact banks can be achieved by incorporating blank spacer strips between adjacent banks, as illustrated in FIG. 3c. Some of the numerous possible combinations are illustrated in FIG. 12.

The construction of the socket-type spring contact strips or banks corresponds substantially to that of the plug-type banks. In this case contact spring elements 11 engageable with the plug elements are of folded construction and may be provided at their contact points with a coating of precious metal.

Following the welding of the contact strips 6, 12 to respective cooperable insulating structures 7, 13 the connection lugs or terminals 14, 15 of the contacts are clipped or bent over depending on the application as illustrated in FIGS. 3, 6, 11 and 12.

Guide members 8, 9 (FIGS. 7 to 10) mounted at the ends of the insulating structures are so designed that the contact parts 16 (e.g. blades or studs) are protected against mechanical damage, a non-interchangeability is assured and a guidance of the structures with respect to one another is achieved.

Figures 8A, 8B:
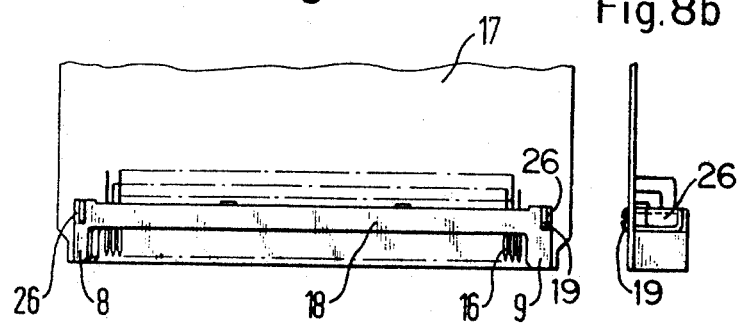
FIGS. 8a and 8b are plan and end views respectively of a terminal strip mounted on a circuit board.
Figures 9A, 9B:
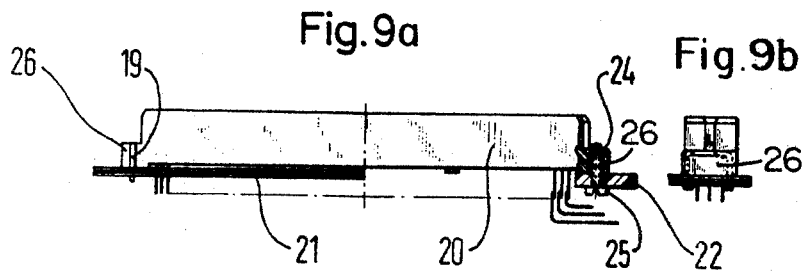
FIGS. 9a and 9b are views, similar to FIGS. 8a and 8b respectively, of a modified construction.

FIG. 8 illustrates a terminal strip retaining structure 18 secured to a circuit board 17 by nails or staples 19 whose free ends are bent over at the face of the circuit board and soldered with the other components. The spring contact strip retaining structure 20 is so designed that it can be inserted into multilayer boards 21, as well as secured between rails 22 and connected by open wiring. Attachment to multilayer boards 21 may be effected by means of staples 19 which are clamped and soldered in holes in the boards. Where rails are employed the mounting may be effected by the use of screws 25 and nuts 24. The mounting flange 26 of the insulating structure renders possible a mounting on circuit boards extending either parallel or at right angles to the plug direction.

In practice the connector structures are provided with 32 terminal contacts in a single row, 64 terminal contacts in two rows and 96 terminal contacts in three rows per structure.

Changes may be made within the scope and spirit of the appended claims which define what is believed to be new and desired to have protected by Letters Patent.

We claim:

1. A plug-and-socket connector miniature type, particularly for printed circuits and the like wherein it is desired that the connector structure possess minimum physical dimensions, comprising a plurality of plug-type contact elements and a plurality of socket-type contact elements, the contact element of each type being in the form of sheet metal stamping and disposed in at least one group, a supporting member for each group of thermoplastic synthetic material in the form of an elongated relatively narrow contact-supporting strip, in which the intermediate part of each contact element is rigidly embedded with the contact elements extending outwardly therefrom at each side thereof, each strip having substantially minimum transverse dimensions consistent with adequate support for mounting said contacts in relatively fixed relation and desired contact spacing, and forming a unitary subassembly of aligned contacts, with the contact portions thereof disposed at one side of said strip and the connecting terminal portions thereof disposed at the opposite side of said strip, and a supporting structure of insulating material having a recess therein of a size to receive at least one of said subassemblies, the latter being rigidly mounted therein with abutting portions of said strip and said supporting structure being bonded together to form an integral structure, the supporting structure for the socket-type contact elements being constructed to provide means for guiding the contact portions of plug-type contact elements into engagement with cooperable contact portions of the corresponding socket-type contact elements.

2. A plug-and-socket connector according to claim 1, wherein a plurality of contact-supporting strips are disposed in side by side relation in the cooperable supporting structure.

3. A plug-and-socket connector according to claim 2, wherein a blank strip is disposed in the cooperable supporting structure between adjacent contact-supporting strips therein.

4. A plug-and-socket connector according to claim 1, wherein the supporting structures are provided with protective and guide members.

5. A plug-and-socket connector according to claim 1, wherein there are arranged on the thermoplastic supporting strip a plurality of pins and recesses for the prevention of inaccurate positioning of such a body in the supporting structure.

6. A plug-and-socket connector according to claim 5 wherein said pins and recesses are so arranged that two contact-supporting strips may be disposed in side-by-side relation with pins on each of such strips disposed in cooperable recesses on the other strip forming interlocking means therebetween, with the contact element on one such strip offset with respect to the contact element on the other such strip.

7. A plug-and-socket connector according to claim 1, wherein the supporting structure for the socket-type contact element is constructed to completely enclose the contact portions thereof and is provided with guide openings therein for receipt of cooperable contact portions of the corresponding plug contact elements.

References Cited

UNITED STATES PATENTS

| | | |
|---|---|---|
| 3,097,036 | 7/1963 | Cornell. |
| 3,173,062 | 3/1965 | Smith et al. |
| 3,324,445 | 6/1967 | Miller. |

FOREIGN PATENTS

| | | |
|---|---|---|
| 1,255,981 | 2/1961 | France. |
| 818,767 | 8/1959 | Great Britain. |

KENNETH DOWNEY, Primary Examiner

U.S. Cl. X.R.

339—17, 218